United States Patent [19]
Szepesi et al.

[11] Patent Number: 5,680,300
[45] Date of Patent: Oct. 21, 1997

[54] REGULATED CHARGE PUMP DC/DC CONVERTER

[75] Inventors: Thomas S. Szepesi, Saratoga, Calif.; A. Martin Mallinson, Kelowna, Canada

[73] Assignee: Analog Devices, Inc., Norwood, Mass.

[21] Appl. No.: 577,848

[22] Filed: Dec. 22, 1995

[51] Int. Cl.[6] .................................................. H02M 3/18
[52] U.S. Cl. ............................ 363/59; 363/60; 363/62
[58] Field of Search ................................ 363/59, 60, 62; 323/282, 283, 288, 285; 307/109, 209

[56] References Cited

U.S. PATENT DOCUMENTS

| | | | |
|---|---|---|---|
| 4,481,566 | 11/1984 | Hoffman et al. | 363/60 |
| 4,752,699 | 6/1988 | Cranford, Jr. et al. | 307/209 |
| 5,245,524 | 9/1993 | Nakagawa et al. | 363/62 |
| 5,397,928 | 3/1995 | Chan et al. | 307/109 |
| 5,502,629 | 3/1996 | Ito et al. | 363/60 |

OTHER PUBLICATIONS

Horowitz, Paul and Hill, Winfield, *The Art of Electronics*, Cambridge University Press, New York, 1989, pp. 142–143, 355–356, 359, 377–379 and 917–985.

Dempsey, John A., *Basic Digital Electronics with MSI Applications*, Addison Wesley Publishing Company, Reading Massachusetts, 1977, p. 199.

*Primary Examiner*—Peter S. Wong
*Assistant Examiner*—Rajnikant B. Patel
*Attorney, Agent, or Firm*—Koppel & Jacobs

[57] ABSTRACT

A charge pump controller provides the timing and drive voltages necessary for an self-regulated charge pump voltage converter. The controller utilizes a conventional non-overlapping two-phase clock to control the timing of switch drivers which control an array of switches. Pump and reservoir capacitors are distributed within the array. One of the switch drivers produces a modulated, or linear, drive voltage for one of the switches in the array in response to the charge pump's output voltage. The controller thereby produces a regulated output voltage from the charge pump.

22 Claims, 3 Drawing Sheets

REGULATED CHARGE PUMP DC/DC CONVERTER

BACKGROUND OF THE INVENTION

1. Field of the Invention

The invention relates to the field of electronic systems which require power at more than one voltage, especially those systems for which the majority of the power consumed is at one standard voltage level and the remaining power requirement, at a different voltage level.

2. Description of the Related Art

Power supply requirements have evolved along with the evolution from analog to digital circuitry. Analog systems typically operate from a multitude of supply voltages; today's digital systems typically require power at only one standard voltage such as 5V or 3.3V. By reducing the number of supply voltages required in this manner, system-level designs benefit from lower cost, lighter weight, reduced volume and higher reliability due to the concomitant reduction in power supply components and power distribution conductors such as printed circuit board power "traces".

In spite of this sea change in electronics, there are still a significant number of systems which require power at voltages in addition to the standard digital 5 or 3.3V levels. For example, systems which include data communication circuits often require negative voltages in addition to the 5 or 3.3V supply; an Electronic Industries Association (EIA) RS232C interface, a popular interface for data communications, specifies signal levels ranging from −25V to +25V. Furthermore, preamplifiers, required for many interfacing applications, often require a negative supply voltage in addition to a positive supply voltage which is greater than the standard digital voltage.

Adding the circuitry required to provide these additional voltage levels can be a costly, frustrating experience. A straightforward approach is to use a dual polarity switching power supply. A description of such a power supply is contained in Paul Horowitz, Winfield Hill, *The Art of Electronics*, Second Edition, Cambridge University Press, New York, 1991 at page 359. The major disadvantage of this approach lies in the fact that the inductor required for the negative voltage supply is typically a bulky, expensive component.

Another approach to producing an additional voltage that is particularly suited to low-power applications is to employ a "charge pump", or "flying capacitor", voltage converter. Charge pumps are discussed in detail by Paul Horowitz, Winfield Hill, *The Art of Electronics*, Second Edition, Cambridge University Press, New York, 1991 at pages 377 through 379.

Basically, an inverting charge pump operates by charging a "pump" capacitor during a clock's first half-cycle, or "pumping phase", to the level of a source voltage. During the clock's second, non-overlapping half-cycle, or "transfer phase", the pump capacitor is disconnected from the source and connected, with its polarity switched, to a second "reservoir" capacitor, thereby "pumping" charge to the reservoir capacitor and providing an output which is approximately the negative of the input voltage.

Similarly, with a minor rearrangement of the pump's switching elements, a step-up converter is produced. During the clock's first half-cycle the pump capacitor is charged to the level of the source voltage. During the clock's second half-cycle, the pump capacitor's positive side is disconnected from the source and its negative side, which had been connected to ground during the first half-cycle, is connected to the source. The positive side, now at twice the source voltage, is connected to the reservoir capacitor, thus charging it to twice the source voltage.

Other exemplary switch network configurations are directed to the generation of different output voltages as a function of the source voltage, e.g., a selectable bipolar doubled output voltage. U.S. Patents directed to charge pump structures include U.S. Pat. Nos. 4,636,930; 4,679,134; 4,777,577; 4,797,899; 4,809,152; 4,897,774 and 5,237,209.

Although the charge pump requires few parts and no inductors, its main drawback is that the output voltage is not regulated, i.e., the output voltage will drop undesirably when subjected to a load and will vary with its input voltage.

To overcome this shortcoming, a variety of regulation schemes have been coupled with the charge pump. One design, for example, feeds the charge pump output back to its oscillator control circuit through a comparator with hysteresis. The comparator's hysteresis accommodates the charge pump's rather noisy output. When the output voltage magnitude exceeds the desired output value, the comparator blocks the "charge pumping" action until the output magnitude falls to a level less than the desired output by an amount equal to the feedback path's hysteresis value. The hysteresis built into the feedback path must be sufficient to compensate for the charge pump's inherently noisy output but, unfortunately, increased hysteresis diminishes output voltage regulation correspondingly.

Another approach to correcting the charge pump's lack of regulation is to use a linear regulator to regulate the charge pump's output. With this approach, a charge pump's output is fed to a linear regulator which regulates the output in a conventional manner, i.e., the output is fed to a pass transistor and the output of the pass transistor is sensed and fed back to provide a bias signal to the pass transistor, thereby providing a regulated voltage at the output of the pass transistor.

Two-phase logic gate clocks are well known in the art and are described by John A. Dempsey in, *Basic Digital Electronics With MSI Applications*, Addison-Wesley Publishing Company, Reading, Mass., 1977, page 199. Additionally, the linear regulator is well known in the art. See Paul Horowitz, Winfield Hill, *The Art of Electronics*, Second Edition, Cambridge University Press, New York, 1991 at pages 355–356.

Some charge pumps employ power FETs as charge-pump switches and they are driven binarily as hard as possible, i.e., their gate to source voltages are as great as possible to reduce their "on" resistance and thereby improve the efficiency of the charge pump. The linear regulator's pass element is also, typically, a power FET. However, this FET is not driven binarily, i.e., into saturation and off like an on/off switch. Rather, the this FET's gate-to-source voltage is modulated to linearly regulate the flow of charge from the pump's reservoir capacitor.

The problem with this approach to charge pump voltage converters is that, in addition to the power FETs which switch charge between the charge pump capacitors, an additional power FET is required for the linear regulator's pass element. Power FETs are relatively large and, because of their size, provide low "on resistance" when driven hard. Therein lies the problem with this approach; the integrated circuit or circuits which contain the charge pump and regulator should be as small as possible to minimize costs and maximize reliability. An additional power FET consumes a significant amount of precious integrated circuit "real estate". The same could be said of charge pumps which employ bipolar transistors, i.e., an additional, bulky transistor is required to regulate the output of the charge pump.

For the forgoing reasons, there is a need for a voltage converter which converts an input voltage to another regulated output voltage without the use of inductors and with a small number of power FETs.

SUMMARY OF THE INVENTION

The invention is directed to a self-regulated charge pump voltage converter which not only provides a regulated output voltage without the use of inductors but does so with fewer power FETs, or, alternatively power bipolar transistors, than previous designs.

The invention is a switch controller which includes a two-phase non-overlapping clock and switch drivers, half of which are enabled during the first phase of the clock, the other half of which are enabled during the second phase. At least one of the drivers provides a drive voltage for its corresponding switch which is a function of the voltage available at the output of the charge pump, thus "self-regulating" the charge pump's output voltage. The remainder of the drivers provide drive voltages in a conventional binary fashion. That is, when they are enabled by the clock, the drivers turn the switches "ON" with the maximum drive voltage available, i.e., into saturation. When they are disabled by the clock, they drive the switches "OFF".

The switch controller is used to implement an inductor-free self-regulated charge pump voltage converter with conventional pump and reservoir capacitors. The switch controller provides a modulated drive voltage for at least one of the switches within the network and binary drive voltages for the remainder. The modulated voltage is a function of the charge pump's output voltage, which provides a feedback mechanism that regulates the output voltage. This eliminates at least one power FET from previous designs, thereby significantly reducing the area required for integrated circuit implementations.

The new charge pump voltage converter can be used in electronic processing systems to accept power at a standard voltage from a power source and convert it to another voltage for use by circuits which require non-standard voltage, such as analog circuit sections, bipolar signaling interfaces or preamplifiers.

The invention is particularly beneficial for portable electronic processing systems. A portable electronic processing system, e.g., portable computer, cellular telephone, hand-held route-accounting device, etc. which incorporates the invention can be lighter, smaller and less expensive than a comparable system which employs conventional power conversion techniques.

These and other features, aspects, and advantages of the invention will be apparent to those skilled in the art from the following detailed description, taken together with the accompanying drawings.

DETAILED DESCRIPTION OF THE INVENTION

Figure 1:
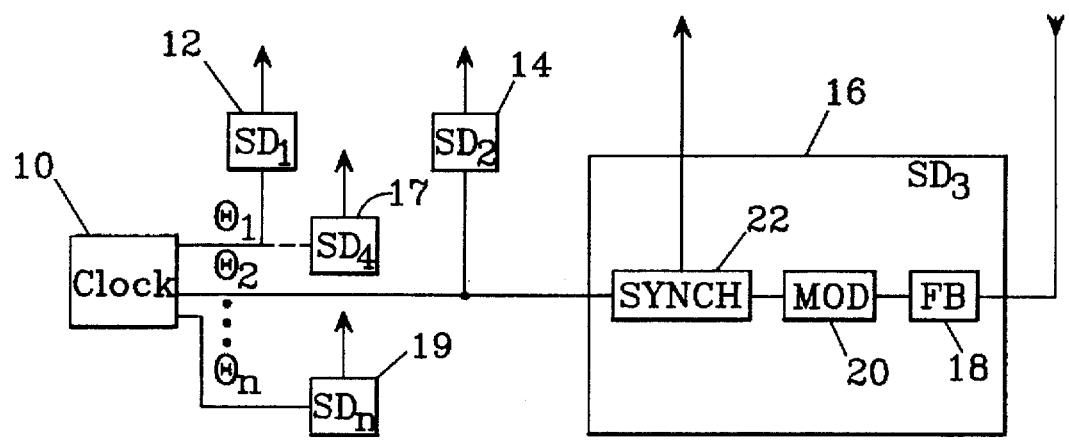
FIG. 1 is a block diagram of a new two-phase switch controller.

FIG. 1 is a block diagram of the invention which illustrates the basic components of the new switch controller. The multi-phase non-overlapping clock 10 enables the switch drivers SD1 12, SD2 14 and SD3 16. Driver SD1 12 is enabled during the first phase of the clock $\theta_1$, drivers SD2 14 and SD3 16 are enabled during the second phase $\theta_2$. Additional switch drivers SDn 17 are enabled by additional clock phases $\theta_n$. Switch drivers SD1 12 and SD2 14 provide conventional binary drive voltages. That is, during the first phase of the clock $\theta_1$, the switch driver SD1 12 produces an "ON" drive level and the switch drivers SD2 14 and SD3 16 produce "OFF" drive levels.

During the second phase of the clock $\theta_2$, the switch driver SD1 12 produces an "OFF" drive level and switch driver SD2 14 produces an "ON" drive level. At the same time, the switch driver SD3 16 produces a modulated drive voltage. The switch driver SD3 16 comprises a feedback block 18 which is connected to a drive modulation block 20 that provides a modulated drive voltage to the synchronization block 22. The level of the modulated voltage from the modulation block 20 depends upon the voltage fed into the feedback block 18. The synchronization block 22 produces an "OFF" drive voltage during the first phase of the clock $\theta_1$ as an output, and produces the modulated voltage as an output during the second phase of the clock, i.e., it gates the modulated voltage "OFF" during the second phase of the clock $\theta_2$.

In normal operation the input to the feedback block 18 would be connected to a charge pump output, the output of the synchronization block 22 would be connected to drive a power FET within the charge pump, the output from SD2 14 would be connected to drive another of the power FETs within the charge pump switch array and the output from SD1 12 would be connected to drive the remaining power FETs within the charge pump array. Furthermore, additional switch drivers SD4 17 like SD3 16 could be employed during any of the clock phases $\theta_1$–$\theta_n$ to provide additional modulated drive signals. However, for the sake of clarity, further FIG.s, and discussions related to those FIG.s, will illustrate two-phase implementations which employ one modulated switch driver such as switch driver SD3 16.

Figure 2:
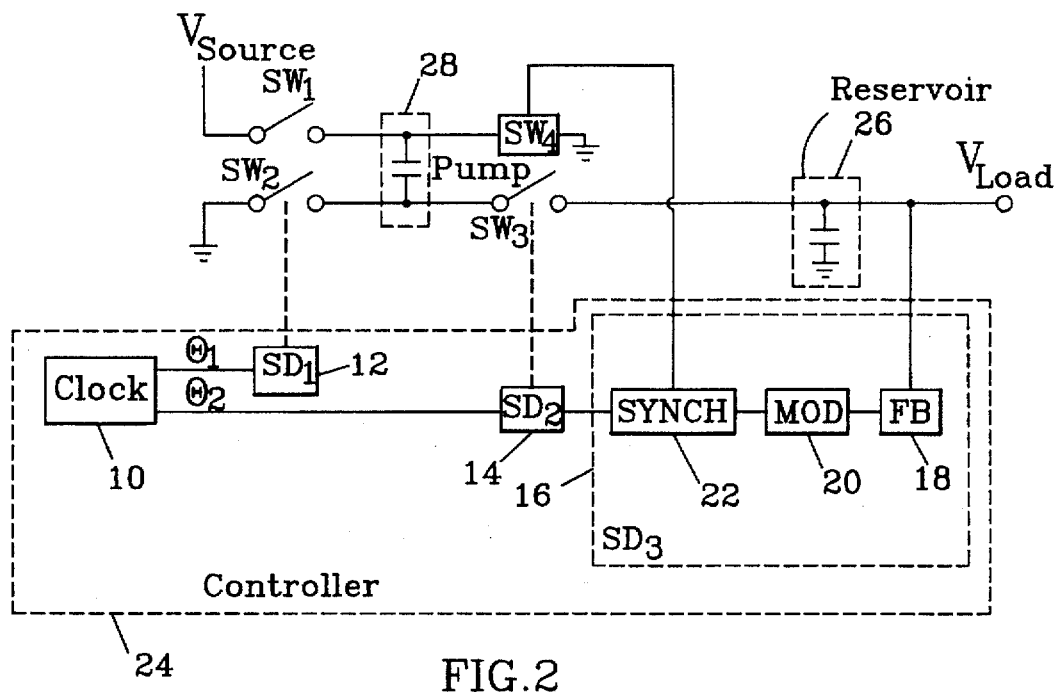
FIG. 2 is a block diagram of a self-regulating inverting charge pump which employs the new switch controller described in FIG. 1.

The block diagram of FIG. 2 illustrates the basic components of one embodiment of a self-regulated charge pump voltage converter employing the new switch controller 24 to produce a voltage inverter. As described above, the charge pump may also be configured as a step-up voltage converter which may be a doubler, tripler, etc. or may, due to self-regulation provide intermediate voltage outputs.

The switches sw1, sw2, sw3 and sw4 are preferably power MOSFETs. In this embodiment, switches sw1, sw2 and sw3 are driven in a conventional binary fashion, i.e., "ON" or "OFF", depending upon the phase of the clock 10. That is, during the first clock phase $\theta_1$ the switch driver SD1 12 drives switches sw1 and sw2 "ON" and the switch driver SD2 14 drives switch sw3 "OFF". During the second clock phase $\theta_2$ switch driver SD1 12 drives switches sw1 and sw2 "OFF" and switch driver 14 drives switch sw3 "ON". The switch drivers 12 and 14 will be discussed in greater detail in connection with FIG. 4.

The switch driver SD3 16, which drives switch sw4, comprises a feedback block 18 connected to the reservoir capacitor 26 which, through this connection, samples the load voltage $V_{load}$. The feedback block 18 is also connected to a drive modulation block 20 which modulates the level of the drive voltage provided to the switch sw4 in response to the output of the feedback block 18. The switch driver 16 further comprises a synchronization block 22 which, under control of the clock 10, gates the modulated voltage from the modulation block through to the switch sw4 during the second phase $\theta_2$ of the clock and gates this drive voltage off during the first phase $\theta_1$ of the clock. In this way the switch sw4 acts as variable resistor, thus controlling the amount of charge which flows into the reservoir capacitor 26 from the pump capacitor 28 during each $\theta_2$ half-cycle. Thus, the switch sw4 acts simultaneously as a charge pump switch and as a linear regulator's pass transistor.

Figure 3:
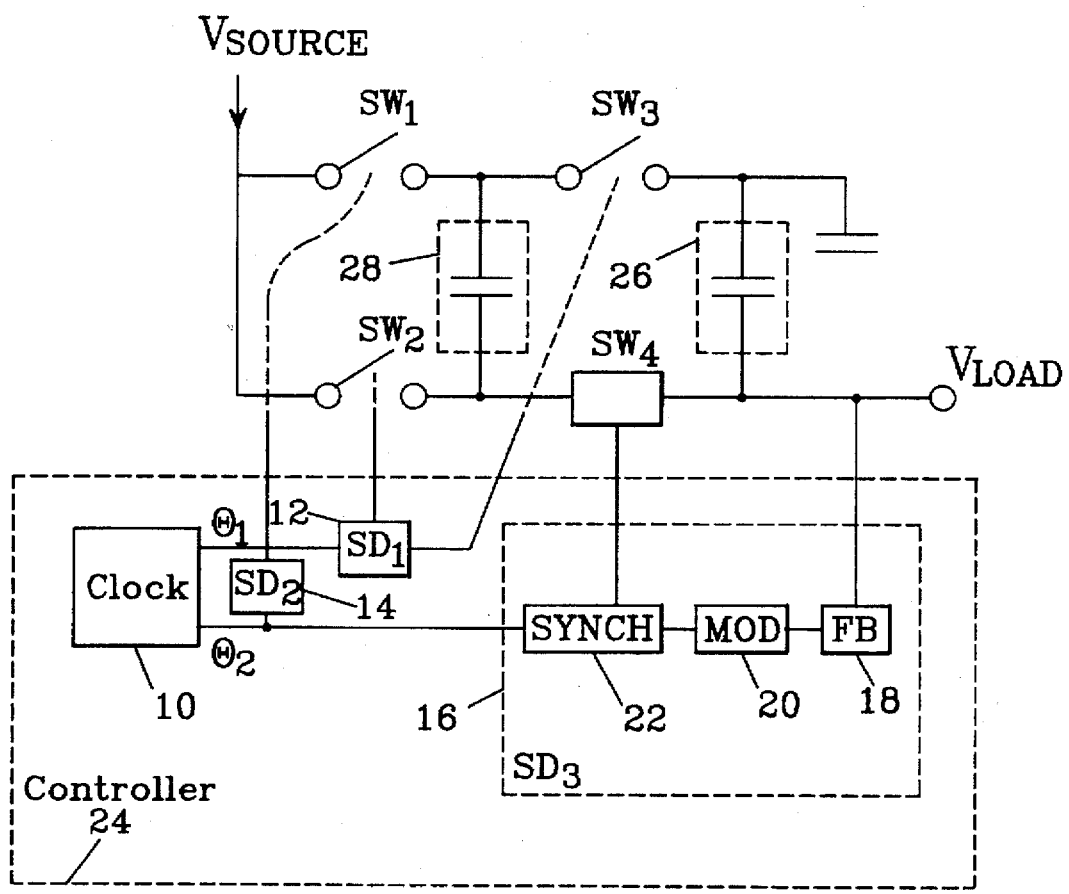
FIG. 3 is a block diagram of a self-regulating step-up voltage converter charge pump which employs the new switch controller.

FIG. 3 illustrates the basic components of a charge pump which employs the invention to yield a self-regulated step-up voltage converter. In the illustrated preferred implementation only one switch, SW4, is "modulated" in the fashion described in relation to switch driver SD3 16 of FIG. 3. However, Sw1 and SW4 may both be driven in such a manner, or SW1 alone may be driven in that fashion. Furthermore, additional clock phases and switch drivers may be added to produce n-tuple multiplication of the input voltage $V_{source}$.

During the first clock phase $\theta_1$ the switch driver 12 drives switches sw2 and sw3 "ON", the switch driver 14 drives switch sw1 "OFF" and the switch driver 16 drives switch sw4 off, thus charging the pump capacitor 28 to the value of $V_{source}$. During the second clock phase $\theta_2$ switch driver 12 drives switches sw2 and sw3 "OFF", switch driver 14 drives switch sw1 "ON" and switch driver 16, as described in connection with FIG.2, modulates the drive voltage to switch sw4 in response to the charge pump's output voltage $V_{load}$, thus providing a regulated output voltage which may be as high, depending upon modulation, as approximately twice the value of $V_{source}$.

Figure 4:
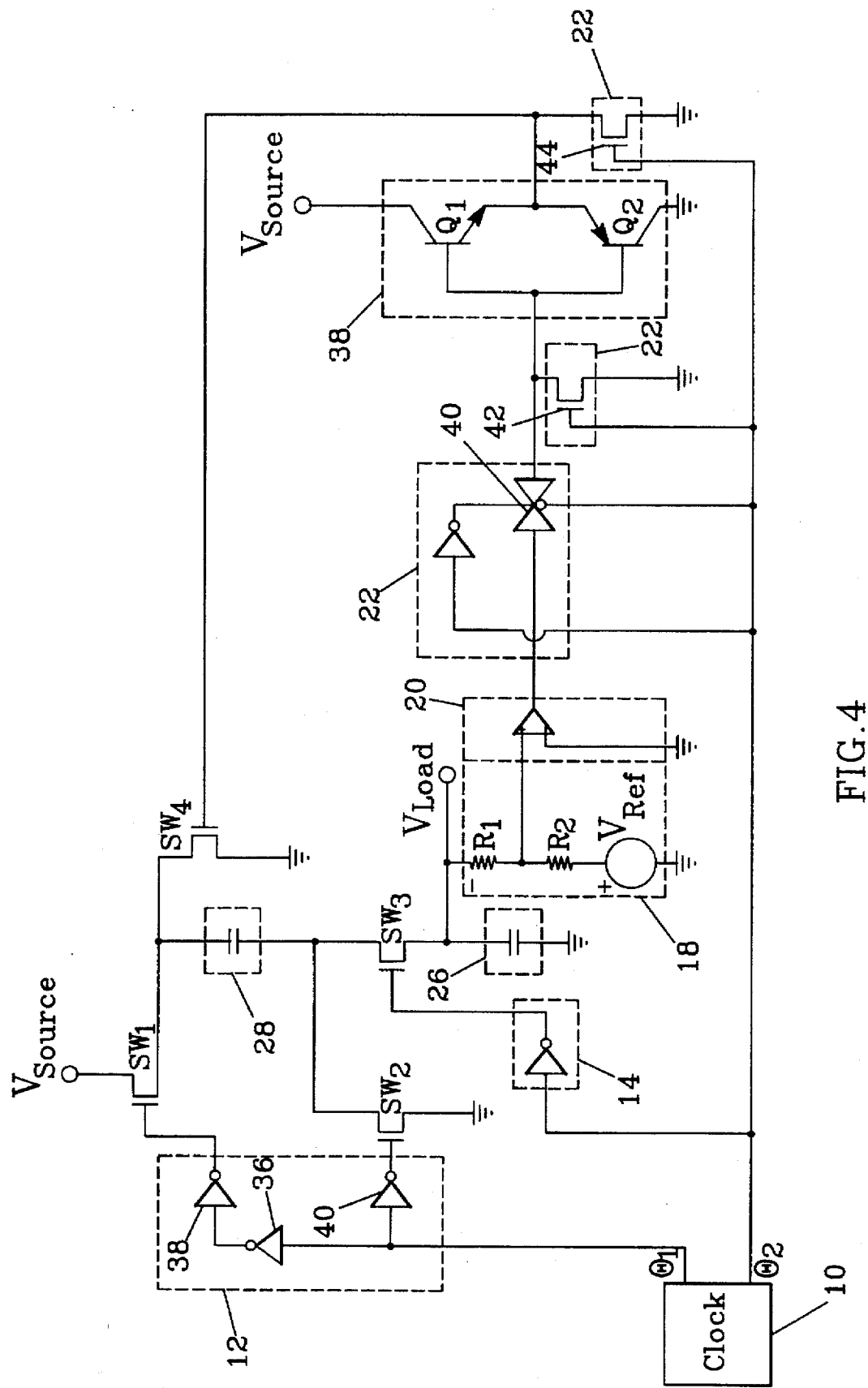
FIG. 4 is a detailed schematic of the self-regulating inverting charge pump of FIG. 2.

In the discussion of FIG. 4, which is a detailed schematic of the integrally regulated inverting charge pump voltage converter of FIG. 2, references are made to CMOS analog switches, transconductance amplifiers, voltage references, CMOS inverters and push-pull amplifiers, all of which are well-known in the art. See Paul Horowitz, Winfield Hill, *The Art of Electronics*, Second Edition, Cambridge University Press, New York, 1991 at pages 142 and 143 for a discussion of CMOS analog switches, page 79 for a discussion of transconductance amplifiers, pages 331–341 for a discussion of voltage references, pages 154 and 155 for a discussion of CMOS inverters and page 91 for a discussion of push-pull amplifiers.

As noted in the discussion of FIG. 2, the switches sw1, sw2, sw3 and sw4 are power MOSFETs. In this embodiment sw1 is a P-channel device: sw2, sw3 and sw4 are n-channel devices. The pump 28 and reservoir 26 capacitors and switch array operate as described in connection with FIG. 2.

The switch driver 12 is composed of three CMOS inverters 36, 38 and 40; inverter 38 is powered by connections to $V_{source}$ and $V_{Load}$ and thus provides the necessary negative drive voltage for p-channel FET sw1. The inverter 36 maintains drive-voltage phase correspondence between the p-channel FET sw1 and the n-channel FET sw2, i.e., it ensures that sw1 and sw2 are turned "ON" and "OFF" simultaneously. Similarly, the switch driver 14 is a CMOS inverter connected between the phase 2 clock output $\theta_2$ and the gate of n-channel FET sw3. The clock outputs are active low signals in this embodiment, that is, when $\theta_1$ is low, sw1 and sw2 are "ON", when $\theta_2$ is low sw3 is "ON" and the synchronization block 22 enables the modulated drive of sw4.

The feedback block 18 comprises a pair of resistors R1 and R2 and voltage reference $V_{ref}$ connected to sense the charge pump output voltage $V_{load}$. The sensed voltage from the feedback block 18 is routed to the drive modulation block 20 which comprises a transconductance amplifier 36. The sensed voltage is fed to the positive input of the amplifier 36 which provides drive current as a function of the sensed voltage for the push-pull drive stage 38 comprising NPN transistor Q1 and PNP transistor Q2. The push-pull drive stage 38 boosts the current output of the amplifier 36 to a level which is sufficient to rapidly drive the gate of power FET sw4.

The synchronization block 22, under control of the phase 2 clock output $\theta_2$, cuts off the drive to sw4 during the first phase $\theta_1$ of the clock; during phase 2 ($\theta_2$ low), the synchronization block 22 enables sw4 to be driven. That is, during the clock's second phase $\theta_2$ an analog switch 40 provides an analog signal path, i.e., one which accommodates a continuously variable signal, from the output of the amplifier 36 to the push-pull stage 38. During this phase, the gate voltages to n-channel FETs 42 and 44 are low, consequently FETs 42 and 44 are "OFF" and the output of the amplifier 36 is conducted through the analog switch 40 and drives the push-pull stage 38 which, in turn, modulates the gate voltage of sw4. During phase 1 $\theta_2$ is high, therefore analog switch 40 is non-conducting and FETs 42 and 44 are "ON", shutting off drive current to the push pull stage 38 and turning sw4 "OFF".

The description of FIG.4 up to this point is applicable to both cycle-by-cycle and averaging loops. That is, this embodiment will accommodate implementations which regulate the charge pump output on a cycle by cycle basis, responding within each phase 2 $\theta_2$ clock cycle to bring the charge pump output back into regulation, or which gradually bring the output back into regulation over a span of more than one clock cycle. Whether the pump regulates cycle-by-cycle or averaging is determined by the speed of the loop, which is, in turn, determined by the capacitance of sw4, the beta of the push-pull stage 38 and the drive of the transconductance amplifier 36. In a preferred cycle by cycle implementation, modulation is effected during the pumping phase; averaging implementations may modulate during any or all phases of the clock.

Figure 5:
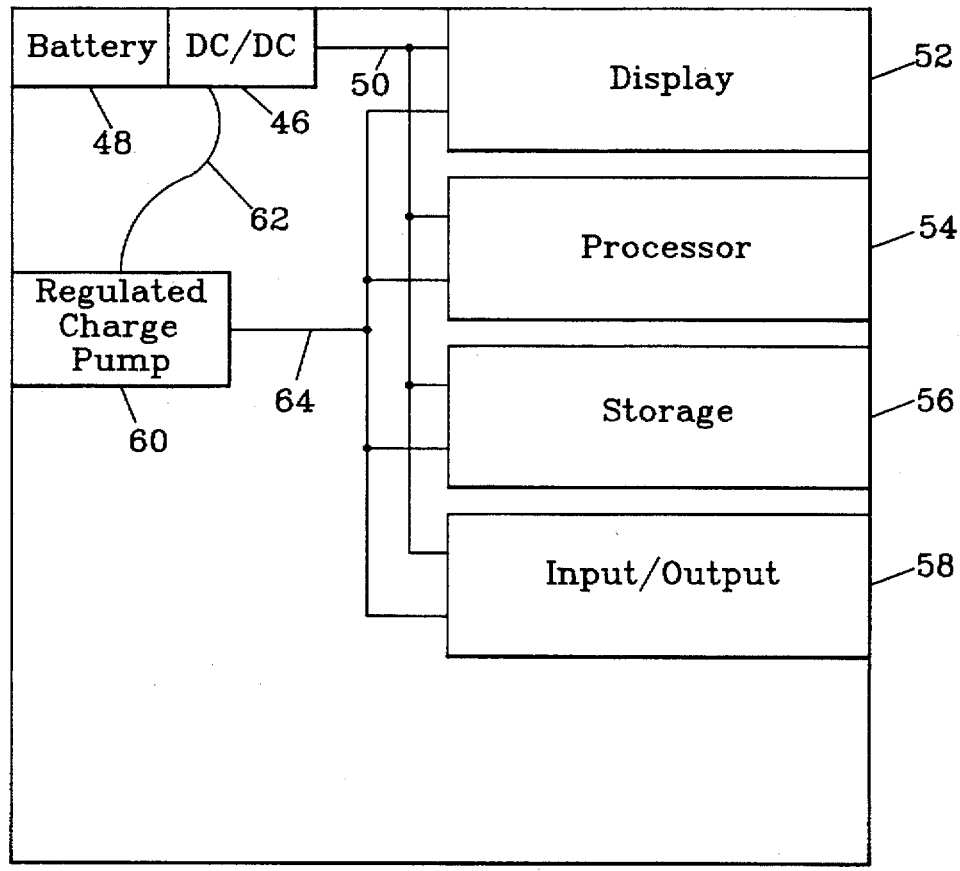
FIG. 5 is a block diagram of an electronic processing system which includes a self-regulating charge pump including the switch controller.

FIG. 5 is a block diagram of a portable processing system which includes a self-regulating charge pump employing the invention. A DC/DC converter 46 receives electrical power from a source 48, a battery in this example. The DC/DC converter provides a regulated output voltage through the connection 50 for use by the processing system components which comprise a display 52, a processor 54, a storage system 56 and an input/output system 58. The DC/DC converter 46 provides a standard regulated voltage such as 5.0 or 3.3V. A self-regulated charge pump 60 is connected through connection 62 to receive power directly from the battery 48. Alternatively, the self-regulated charge pump 60 could receive power directly from the DC/DC converter 46.

The charge pump provides regulated power through connection 64 at a voltage different from that provided by the DC/DC converter 46 to the display 52, the processor 54, the storage system 56 and the I/O system 58. As noted above, the I/O system may require power at the voltage provided by the charge pump 60 for any of a variety of applications including: bipolar signaling, an analog interface, for powering a preamplifier, etc. The storage system may include storage devices which require a separate programming voltage; this voltage may be provided by the charge pump 60. The processor 54 may include an analog interface which permits the use of voltages other than the standard voltage; this is provided by the charge pump 60. Finally, the display 52 may also require a non-standard voltage which is supplied by the charge pump 60.

The charge pump may, as illustrated, distribute power to various system functional blocks which could all be on the same "circuit board" or can be distributed throughout the portable electronic processor on multiple circuit boards. Alternatively, because of its compactness, it could be incorporated in the same integrated circuit as any of the various system components depicted here. For example, an input/output system integrated circuit that provides bipolar signaling could include the inventive self-regulated inverting charge pump converter to produce the negative voltage necessary for the bipolar signaling.

The forgoing description of specific embodiments of the invention has been presented for the purposes of illustration and description. It is not intended to be exhaustive or to limit the invention to the precise forms disclosed, and many modifications and variations are possible in light of the above teachings. For example, the switches could be any combination of p- or n-channel power FETs or bipolar transistors. The inverters could be n-channel, p-channel or JFET inverters. The clock outputs could directly drive the switches sw1-sw4. Further, although in the embodiments disclosed the switches sw1, sw2 and sw3 are conventionally driven, and the switch sw4 is driven in response to feedback from the charge pump output, any of the switches sw1, sw2, sw3 or sw4 may be driven in response to feedback from the output.

The embodiments were chosen and described in order to best explain the principles of the invention and its practical application and to thereby enable others skilled in the art to best utilize the invention. It is intended that the scope of the invention be limited only by the claims appended hereto.

We claim:

1. A switch controller for a charge pump which is disposable between an electrical supply source and a load circuit and which includes switches, comprising:
   a multi-phase non-overlapping clock, and
   switch drivers for charge pump switches connected to the clock such that one pair of the drivers are enabled during one phase of the clock and the other pair of drivers are enabled during another phase, at least one of said switch drivers additionally being connected to receive a signal from the output of a charge pump that is indicative of the difference between the output voltage of said charge pump and a fixed reference voltage and to provide a continuously modulated switch control drive signal which produces a regulated charge pump output voltage in response to said signal from the output of said charge pump.

2. The switch controller of claim 1, wherein the clock is a two-phase, fifty percent duty cycle clock.

3. The controller of claim 1, wherein the variable switch control drive signal is a modulation voltage.

4. The switch controller of claim 1, wherein the switch driver which is connected to receive a signal from the output of a charge pump further comprises a synchronization circuit which gates the output of said driver off during one phase of the clock.

5. A self-regulated charge pump disposable between an electrical supply source and a load circuit, comprising:
   a transistor switch network including at least two pairs of transistors, with at least one of said transistors connected as a pass transistor,
   a reservoir capacitor connected to supply a load voltage to a load circuit,
   a pump capacitor connected to supply charge to the reservoir capacitor, and
   a switch controller connected to said switch network and operative to isolate said pump capacitor from said reservoir capacitor in a first switching phase and to connect the pump capacitor to charge the reservoir capacitor in a second switching phase and to thereby produce a regulated output voltage across the reservoir capacitor,
   said switch controller producing at least one switch control signal that is varied continuously as a function of the difference between the output voltage of the charge pump and a fixed reference voltage, said switch controller further being connected to conduct electrical charge between a supply source and said pump capacitor in said first switching phase and to conduct electrical charge between said pump capacitor and said reservoir capacitor in said second switching phase, and to employ the continuously varied switch control signal to modulate the control terminal of said at least one pass transistor.

6. The self-regulated charge pump of claim 5, wherein the feedback signal is based upon the load voltage.

7. The self-regulated charge pump of claim 5, wherein the switch network comprises four field effect transistors.

8. The self-regulated charge pump of claim 7, wherein the switch controller drives one of the field effect transistors linearly.

9. The self-regulated charge pump of claim 8, wherein the remaining transistors are driven binarily.

10. The self-regulated charge pump of claim 8, wherein each phase comprises repetitive cycles and said switch controller modulation of charge conduction during said second phase maintains said load voltage in regulation during each cycle of said second phase.

11. The self-regulated charge pump of claim 8, wherein each phase comprises repetitive cycles and said switch controller modulation of charge conduction during said second phase permits said load voltage to fall out of regulation in at least one cycle of said second phase.

12. A self-regulated charge pump inverter disposable between an electrical supply source and a load circuit, comprising:
   a transistor switch network including at least two pairs of transistors, with at least one of said transistors connected as a pass transistor,
   a reservoir capacitor connected to supply a load voltage to a load circuit,
   a pump capacitor having first and second terminals and having connections to said switch network, and
   a switch controller connected to said switch network and operative to connect said first pump capacitor terminal to said supply source for conduction of charge therefrom in a first switching phase, and to connect said second pump capacitor terminal to said reservoir capacitor for conduction of charge thereto in a second switching phase, and to thereby produce a regulated output voltage across the reservoir capacitor of opposite sense to that of said supply source, said switch controller producing at least one switch control signal that is varied continuously as a function of the difference between the output voltage of the charge pump and a fixed reference voltage and employing said continuously varied switch control signal to modulate the control terminal of said at least one transistor connected as a pass transistor.

13. A self-regulated charge pump voltage doubler disposable between an electrical supply source and a load circuit, comprising:

a transistor switch network including at least two pairs of transistors, with at least one of said transistors connected as a pass transistor, a reservoir capacitor connected to supply a load voltage to a load circuit, a pump capacitor having first and second terminals and having connections to said switch network, and a switch controller connected to said switch network and operative to connect said first pump capacitor terminal to said supply source for conduction of charge therefrom in a first switching phase, and to connect said first pump capacitor terminal to said reservoir capacitor and said second pump capacitor terminal to said supply source in a second switching phase, to thereby produce a regulated output voltage across the reservoir capacitor of the same sense as, but of greater magnitude than, that of said supply source, said switch controller producing at least one switch control signal that is varied continuously as a function of the difference between the output voltage of the charge pump and a fixed reference voltage and employing said continuously varied switch control signal to modulate the control terminal of said at least one transistor connected as a pass transistor.

14. An electronic processing system, comprising:

an electrical power source, a power converter connected to the power source to provide electrical power at a first voltage level, first load circuitry which is operative at said first voltage level and is connected to receive power from the power converter at said first voltage level, second load circuitry which requires power at a second voltage level which is different from the first voltage level, and a self-regulated charge pump connected to receive power from the power converter and to supply power at said second voltage level to said second load circuitry, said self regulated charge pump comprising:

a transistor switch network including at least two pairs of transistors, with at least one of said transistors connected as a pass transistor, a reservoir capacitor connected to supply a load voltage to a load circuit, a pump capacitor having connected to supply charge to the reservoir capacitor, and a switch controller connected to said switch network and operative to isolate said pump capacitor from said reservoir capacitor in a first switching phase and to connect the pump capacitor to charge the reservoir capacitor in a second switching phase, and to thereby produce a regulated output voltage across the reservoir capacitor, said switch controller producing at least one switch control signal that is varied continuously as a function of the difference between the output voltage of the charge pump and a fixed reference voltage, said switch controller further being connected to conduct electrical charge between a supply source and said pump capacitor in said first switching phase and to conduct electrical charge between said pump capacitor and said reservoir capacitor in said second switching phase, and to employ the continuously variable switch control signal to modulate the control terminal of said at least one pass transistor.

15. The electronic processing system of claim 14, wherein a processor is connected to obtain power from said power converter.

16. The electronic processing system of claim 15, wherein said processor is additionally connected to obtain power from said charge pump.

17. The electronic processing system of claim 14, wherein the second load circuitry includes circuitry for sensing a physical phenomenon.

18. The electronic processing system of claim 17, wherein the sensing circuitry comprises temperature sensing circuitry.

19. The electronic processing system of claim 17, wherein the sensing circuitry comprises voltage sensing circuitry.

20. The electronic processing system of claim 14, wherein the second load circuitry is connected to receive power from both the power converter and the charge pump.

21. The electronic processing system of claim 20, wherein the second load circuitry comprises a pre-amplifier.

22. The electronic processing system of claim 20 wherein the second load circuitry operates from bipolar supply voltages.

* * * * *